(12) United States Patent
Boldrini et al.

(10) Patent No.: US 7,828,198 B2
(45) Date of Patent: Nov. 9, 2010

(54) POURING SPOUT FOR A CONTAINER AND CONTAINER PROVIDED WITH SUCH A SPOUT

(75) Inventors: Fulvio Boldrini, Ferrara (IT); Roberto Ghiotti, Calderino di Monte San Pietro (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 721 days.

(21) Appl. No.: 10/508,253

(22) PCT Filed: Mar. 17, 2003

(86) PCT No.: PCT/IB03/01057

§ 371 (c)(1),
(2), (4) Date: Sep. 20, 2004

(87) PCT Pub. No.: WO03/078258

PCT Pub. Date: Sep. 25, 2003

(65) Prior Publication Data

US 2005/0127118 A1    Jun. 16, 2005

(30) Foreign Application Priority Data

Mar. 20, 2002  (IT) .......................... BO2002A0133

(51) Int. Cl.
*B65D 3/00* (2006.01)
(52) U.S. Cl. ................. 229/125.015; 222/566
(58) Field of Classification Search .......... 229/125.015, 229/125.01, 162.1, 162.7, 125.14, 124, 125.15, 229/131.1, 800; 215/43, 44, 220; 222/574
See application file for complete search history.

(56) References Cited

U.S. PATENT DOCUMENTS

| | | | |
|---|---|---|---|
| 1,100,448 A | | 6/1914 | Selz |
| 2,819,001 A | | 1/1958 | Pottle |
| 3,690,524 A | * | 9/1972 | Haberhauer ................. 222/573 |
| 4,903,848 A | | 2/1990 | Chattman |
| 5,046,660 A | | 9/1991 | Magnoni |
| 5,088,642 A | | 2/1992 | Farber |
| 5,176,313 A | * | 1/1993 | Curry et al. ............. 229/125.15 |
| 6,016,953 A | * | 1/2000 | Stacy-Ryan et al. ..... 229/125.15 |
| 6,478,175 B1 | * | 11/2002 | Tuckner et al. ............. 215/329 |
| 7,597,244 B2 | * | 10/2009 | Boldrini et al. ........ 229/125.14 |
| 2001/0008252 A1 | * | 7/2001 | Ammons et al. ............ 229/184 |

FOREIGN PATENT DOCUMENTS

GB    2236095 A    3/1991
WO    01/76966    10/2001

OTHER PUBLICATIONS

International Search Report dated Mar. 7, 2003.

* cited by examiner

*Primary Examiner*—Nathan J Newhouse
*Assistant Examiner*—Christopher Demeree
(74) *Attorney, Agent, or Firm*—Timothy J. Klima; Shuttleworth & Ingersoll, PLC (57) ABSTRACT

A duct (1) applicable to a container (4) presents a connecting portion (9) with four substantially flat connecting surfaces (9*a*) and a internal bridging surface (13) by which the side walls (7*a*) of the container (4) are joined seamlessly to a spout (5) afforded by the duct (1); the bridging surface (13) is contoured in such a way that a flow of liquid food product can be directed through the spout (5) without becoming trapped and stagnating between the duct (1) and side walls (7*a*) of the container (4).

13 Claims, 6 Drawing Sheets

POURING SPOUT FOR A CONTAINER AND CONTAINER PROVIDED WITH SUCH A SPOUT

This application is the National Phase of International Application PCT/IB03/01057 filed Mar. 17, 2003 which designated the U.S. and that International Application was published under PCT Article 21 (2) in English.

TECHNICAL FIELD

The present invention relates to a communicating duct for containers.

The invention relates also to a container furnished with such a duct.

In particular, albeit with no limitation in general scope implied, the present invention relates to a container for food products, for example containers designed to hold liquid products in general such as milk, fruit juices, yoghurt, mineral water, and/or fluid products broadly considered, of which the chemical and organoleptic properties can easily be impaired and spoiled.

BACKGROUND ART

Liquid and fluid products of the type mentioned above are packaged conventionally by bottling in containers of which the structure can be fabricated employing a multi-layer or treated paper material, for example cardboard or paperboard coated with one or more layers of food-safe material suitable for liquids.

Containers of the type in question are fashioned generally from flat diecut blanks, detached generally from a roll and then folded suitably along precreased lines in such a way as to form recipients capable of holding the liquid product.

It is standard practice for a communicating duct embodied typically as a tubular element to be applied to the top of each container, providing a spout from which to pour the product; the end of the tubular element farthest from the container can be closed by means of a suitable cap.

The communicating duct is secured to the structure of the respective container by means of a weld, such as will unite the topmost edges of the container structure with a cylindrical portion of the tubular element constituting the duct.

To ensure the communicating ducts are correctly positioned on the respective containers, each duct is furnished with an annular projection serving to delimit the weldable surface of the tubular element uppermost, and affording a stop against which the top edge of the container structure is caused to locate.

Still with reference to the positioning of the communicating ducts on the structures of the relative containers, each communicating duct is furnished generally with one or more projections positioned to locate between joined areas of the container in such a way that each projection will be united with the selfsame joined areas in the course of the welding operation.

Moreover, the welding operations in question typically involve the application of heat, and in order to offset any contraction of the material used to fashion the communicating duct, the longitudinal dimension presented by the tubular element of the duct is greater than the effective longitudinal dimension of the weldable surface, projecting internally of and toward the bottom of the container.

Whilst the communicating ducts thus described afford a protected passage to the food product, it has been found nonetheless that they are not free of drawbacks and might be improved from certain standpoints, as concerning principally the chemical and organoleptic preservation of the bottled food product, the fluid-tightness of the welded areas by which the communicating ducts and the respective containers are united, and the simplicity of the welding operations.

More exactly, it has been found that an excessive oversizing of the tubular element, intended to offset the contraction of the material during the welding operation, results in the formation of hollow retention pockets between the walls of the container and the innermost end of the spout afforded by the tubular element. These pockets are particularly disadvantageous in that they complicate the process of cleaning the inside of the containers after the welding operation, as well as degrading the operation of disposal when the containers are no longer of use. During the washing process, in effect, which is conducted generally with the container sealed and using a special flushing liquid, it happens that a part of the liquid will collect in the aforementioned pockets when the container is emptied. Naturally enough, the presence of the flushing liquid inside the container implies that the food product batched subsequently into the selfsame container will become tainted. Accordingly, the manufacturer is forced to make use of devices designed especially to remove the residual cleansing liquid. This obviously dictates an increase in the costs of producing, and subsequently of marketing the end product.

As regards disposal of the containers on the other hand, the pockets tend undesirably to trap a part of the liquid product used by the consumer, which can then escape accidentally both when the container is placed in the refuse collection bin, and during the operations of crushing and compacting thereafter.

Moreover, the structure of prior art communicating ducts as described above does nothing to facilitate the welding process, given that one or more gaps can form subsequently between the external cylindrical surface of the tubular element and the flat walls of the relative container, tending thus to impede a proper isolation of the bottled product from the surrounding environment.

The object of the present invention is to overcome the problems described above through the adoption of a communicating duct for containers that can both guarantee a fluid-tight seal and ensure there will be no stagnation in the container either of flushing liquids, after the cleansing operation, or of liquid food products when poured for consumption.

A further object of the invention is to simplify the operations by which the communicating duct and the relative container are joined together.

DISCLOSURE OF THE INVENTION

The stated object is realized according to the present invention in a communicating duct for containers, comprising at least one tubular element anchorable to an outlet portion of a container in such a way as to create at least one spout affording a passage between the container and the surrounding environment, and at least one connecting portion presenting at least one connecting area such as can be united hermetically with the outlet portion of the container, characterized in that the connecting portion presents an internal bridging surface departing from the outlet portion and converging toward a longitudinal axis of the tubular element (2).

The stated object is realized similarly in a container fashioned from at least one sheet of paper material, comprising a structure composed of at least one base portion, at least one outlet portion permanently associated and combining with the base portion to afford at least one cavity containing at least one food product, and at least one communicating duct anchorable to a outlet portion of the container in such a way as to create at least one spout affording a passage between the cavity and the surrounding environment, characterized in that the communicating duct embodies the features recited in one or more of the appended claims 1 to 18 relating to the selfsame communicating duct.

The invention will now be described in detail, by way of example, with the aid of the accompanying drawings, in which.

With reference to the drawings, 1 denotes a communicating duct for containers, in its entirety, embodied according to the present invention.

The communicating duct 1 comprises at least one tubular element 2 anchorable to a structure 3 of a container 4 and serving thus to establish at least one spout 5 connecting the inside of the container with the surrounding environment.

The container 4 is fashioned preferably from one or more blanks (not illustrated, being conventional) of a multi-layer paper material, for example paperboard or cardboard coated with one or more layers of a food-safe film at least on the surface exposed to the product.

Figure 1:
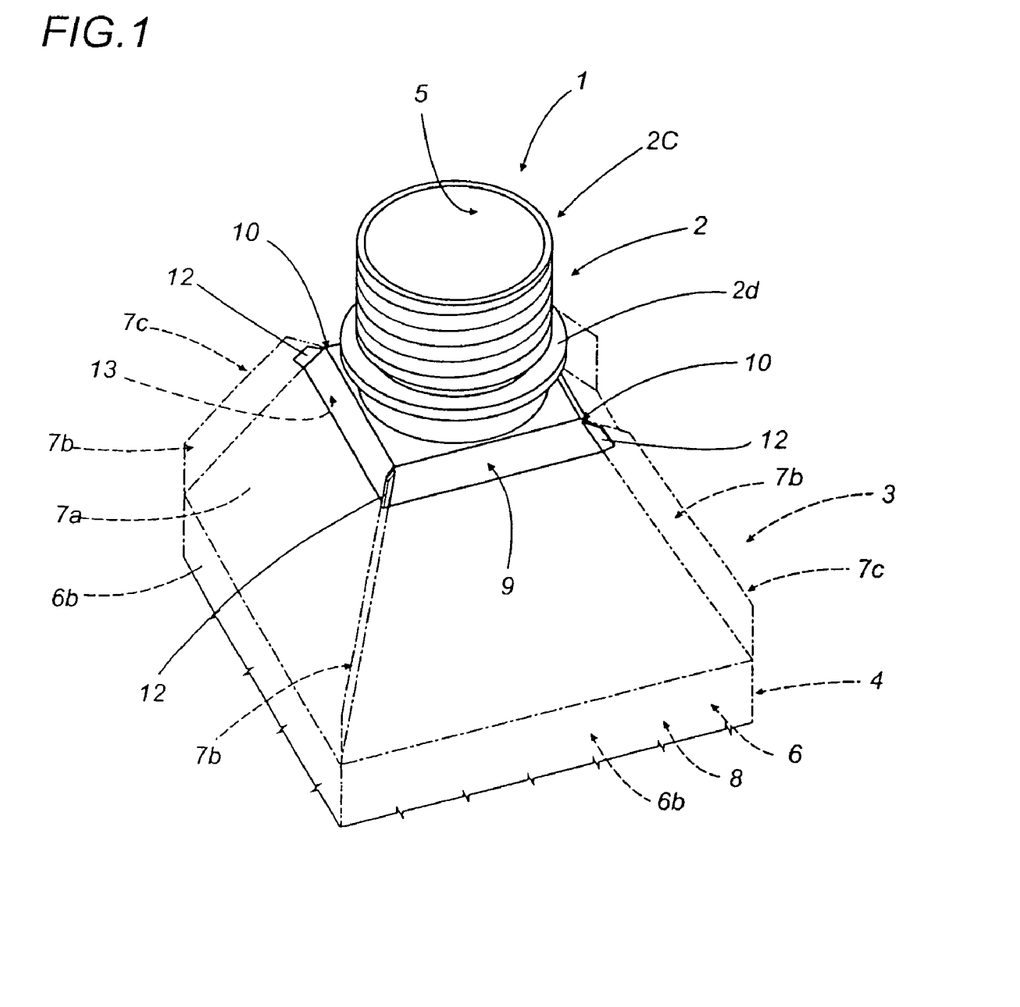
FIG. 1 illustrates a first embodiment of a communicating duct for containers according to the present invention, associated with a portion of a respective container and viewed in perspective.
Figure 4:
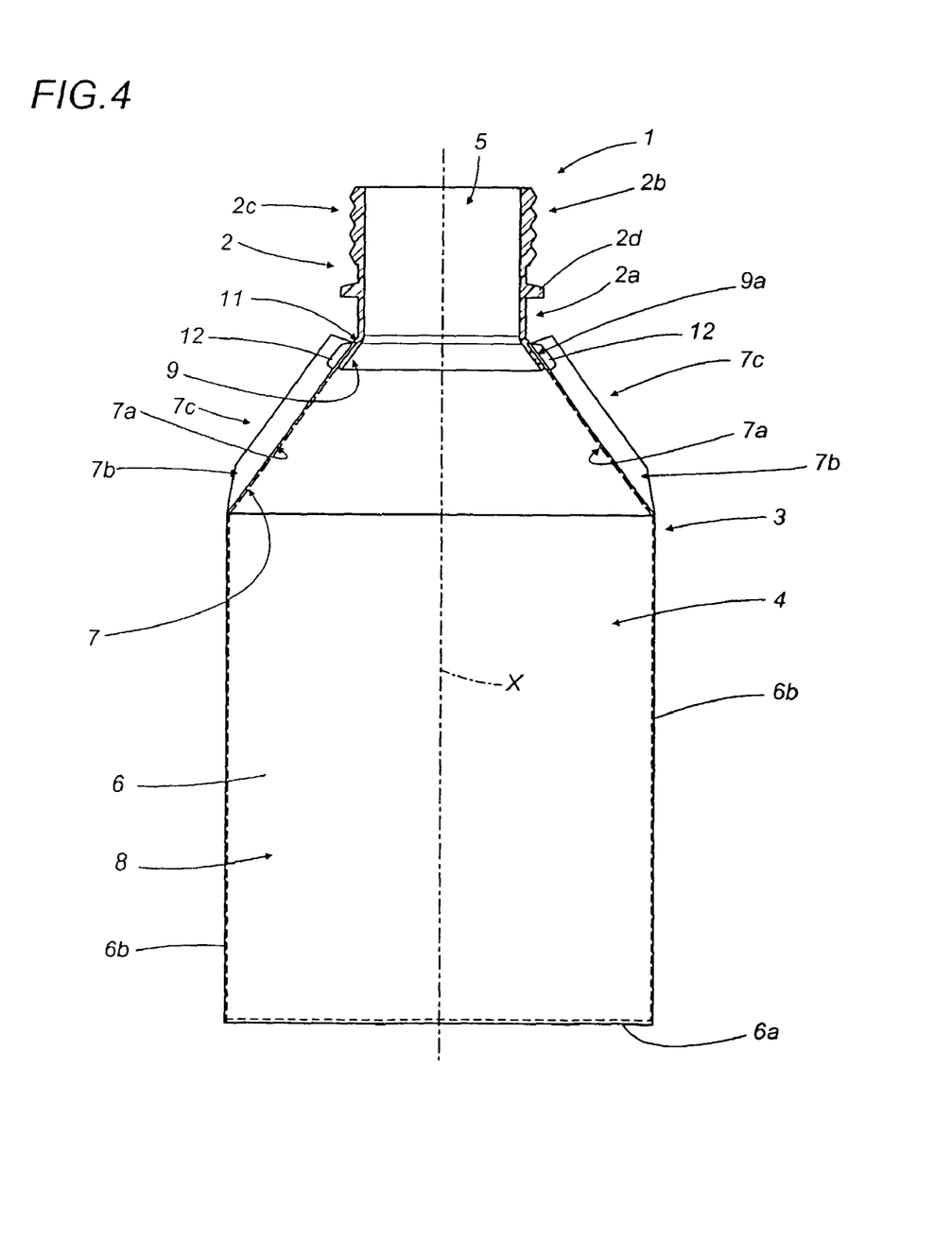
FIG. 4 shows the communicating duct of FIGS. 1, 2 and 3, associated with a container for liquid food products and viewed in a diametral section.

As illustrated partly by the phantom lines of FIG. 1, and in FIG. 4, the structure 3 of the container 4 comprises a substantially box-like base portion 6 rigidly associated uppermost with an outlet portion 7 of substantially frustopyramidal geometry, funnel-like in appearance. The base portion 6 and the outlet portion 7 combine to create at least one cavity 8 such as will contain a food product, and preferably a liquid food product.

More exactly, the base portion 6 presents at least a base 6a of substantially polygonal outline and a plurality of substantially quadrangular side walls 6b departing one from each side of the base.

The outlet portion 7 likewise presents a set of side walls 7a substantially of isosceles trapezoidal outline, extending diagonally from the relative side walls 6b of the base portion 6. Each side wall 7a of the output portion 7 is connected to the two adjacent side walls 7a by way of respective seams 7b bonded hermetically together through the agency of suitable means (not illustrated) to create respective joined areas 7c.

In like manner, given that the structure 3 of the container 4 is erected from a blank of paper material, the base portion 6 also presents respective seams (not illustrated), longitudinally disposed and folded in such a manner as to lie flat against the respective side walls 6a, occupying a minimum of space.

The side walls 7a of the outlet portion 7 are mutually convergent, centred on a longitudinal axis X of the container 4 and terminating uppermost in an opening 7d to which the communicating duct 1 can be anchored, so that the spout 5 created by the duct will afford a passage through which the cavity 8 and the surrounding environment are connected.

As discernible in the accompanying drawings, the communicating duct 1 is anchorable to the outlet portion 7 of the container 4 by way of a connecting portion 9 located at a bottom end 2a of the tubular element 2.

In particular, the connecting portion 9 presents at least one connecting area 9a extending substantially parallel to the outlet portion 7 of the container 4 in such a way that it can be offered entirely flush and joined hermetically to the selfsame outlet portion.

In the example of FIGS. 1 and 4, the connecting area 9a is anchored to the inside face of the outlet portion 7 and thus concealed entirely.

More precisely, the connecting area 9a presents a plurality of connecting surfaces 9b arranged around a longitudinal axis Y of the tubular element 2 which, when the communicating duct 1 is secured in place, will coincide with the longitudinal axis X of the container 4. Each connecting surface 9b is thus angled in relation to the longitudinal axis Y and extends between two adjacent connecting surfaces 9b.

In practice, each connecting surface 9b engages a respective adjacent connecting surface 9b along one of two opposite side edges 9c, thereby establishing at least one corner edge 10 positioned facing a respective internal corner formed between two side walls 7a of the outlet portion 7 presented by the container 4.

To ensure an optimum fluid-tight association between the communicating duct 1 and the container 4, the connecting surfaces 9b are equal in number to the side walls 7a of the outlet portion 7, hence also to the side walls 6a of the base portion 6 of the selfsame container 4. Moreover, each connecting surface 9b appears substantially flat and extends substantially parallel to the respective side wall 7a of the outlet portion 7, thus markedly facilitating a secure join between the two components.

Figure 2:
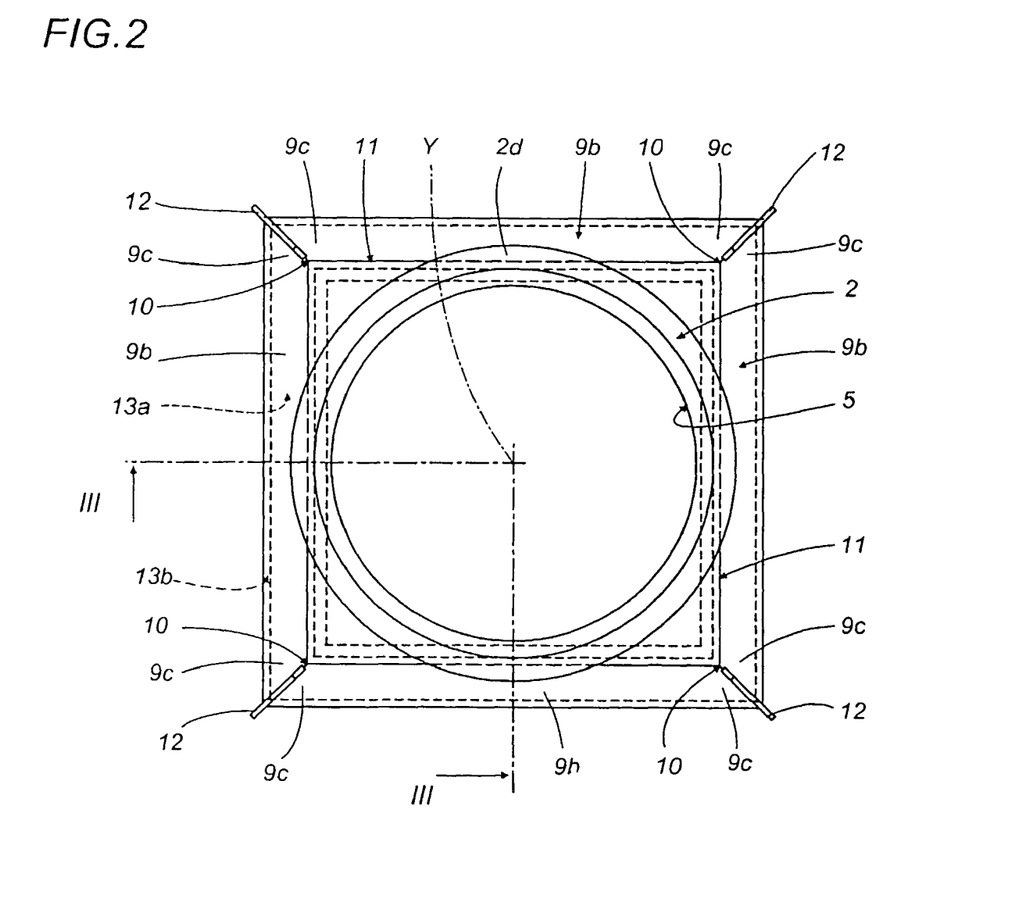
FIG. 2 shows the communicating duct of FIG. 1 viewed in plan.
Figure 3:
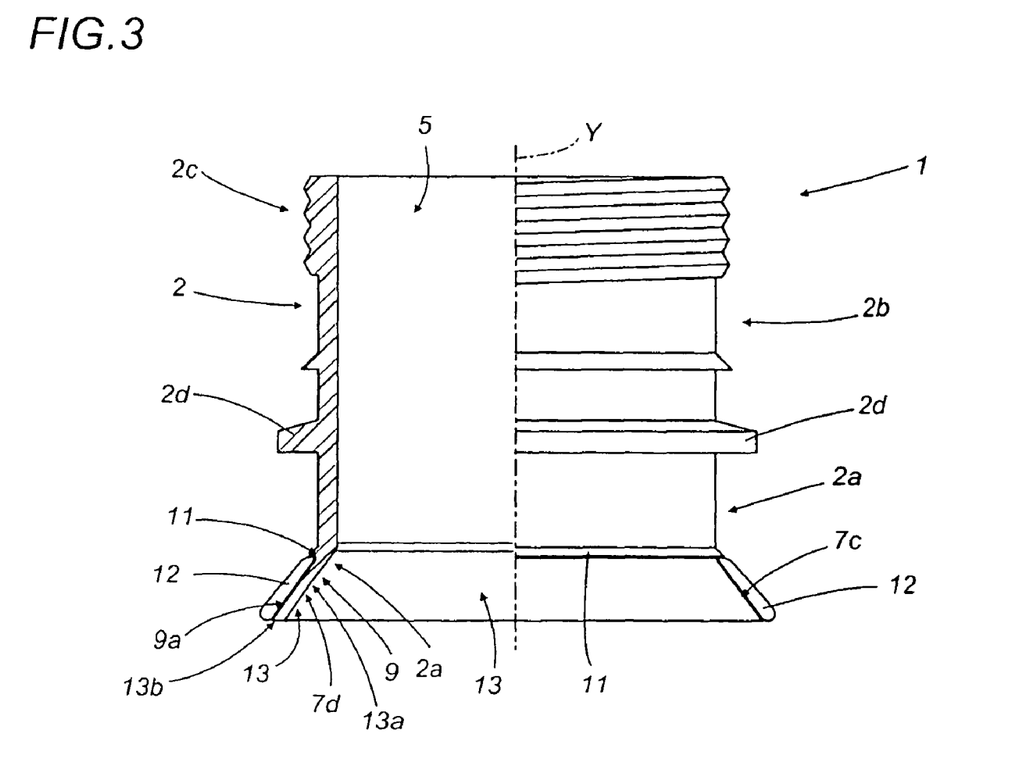
FIG. 3 is a half-section of the duct illustrated in FIGS. 1 and 2, taken on III-III in FIG. 2.
Figure 5:
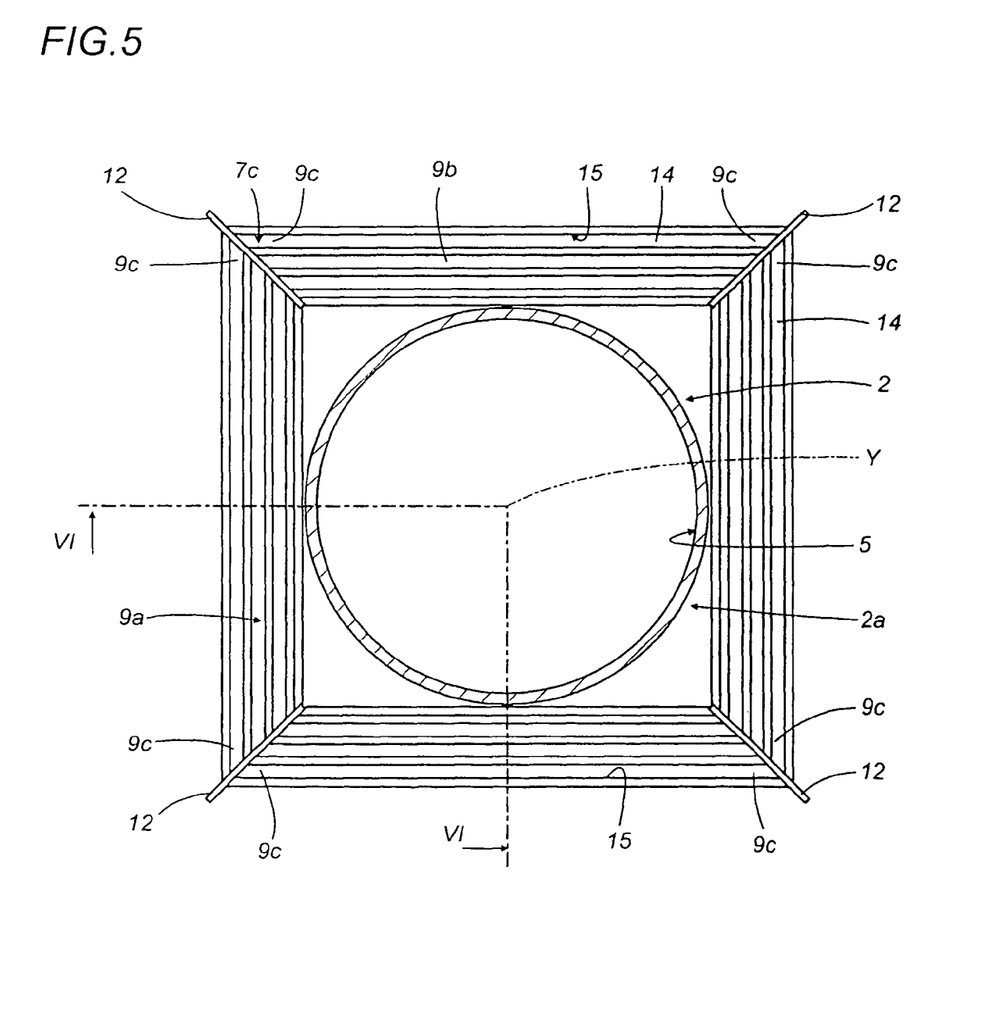
FIG. 5 illustrates a second embodiment of the communicating duct according to the invention, viewed in plan.

As discernible in FIGS. 2 and 5, the connecting surfaces 9b are disposed in such a way as to describe a polygon, viewed in a plane substantially transverse to the longitudinal axis Y of the tubular element 2, which appears in the particular example illustrated as a square.

Still referring to the transverse plane mentioned above, each connecting surface 9b of the connecting area 9a is set at an angle such as will render the connecting portion 9 substantially frustopryamidal in appearance. Given the geometry of the connecting portion 9, moreover, each connecting surface 9b presents a substantially trapezoidal outline similar to the outline presented by each side wall 7a of the outlet portion 7.

The connecting portion 9 of the tubular element 2 also presents a locating element 11 positioned transversely relative to the connecting area 9a and in such a way as to engage in abutting contact with a terminal edge 7d presented by the respective side wall 7a of the outlet portion 7.

More exactly, each connecting surface 9b of the connecting area 9a presented by the connecting portion 9 is furnished with a respective locating element 1 projecting from a top side of the relative connecting surface 9b and extending its full length, so that the locating element 11 of each connecting surface 9b is joined at the relative side edges 9c to the locating elements 11 of the adjacent connecting surfaces 9b.

As discernible in the accompanying drawings, the connecting portion 9 of the tubular element 2 presents at least one projection 12 extending radially from the connecting area 9a in relation to the longitudinal axis Y of the tubular element 2 and insertable hermetically between the two seams 7b of a corresponding joined area 7c presented by the outlet portion 7, in such a way as to form a single entity with the selfsame seams once the assembled components have been suitably welded together.

In the examples illustrated, each corner edge 10 of the connecting portion 9 is furnished with a relative radially cantilevered projection 12 extending between the seams 7b of a respective joined area 7c of the outlet portion 7. The projections 12 present a substantially flat and slender profile such as will favour their insertion between the seams 7b of the outlet portion 7 and allow the seams to bond without difficulty during the welding operation.

To advantage, the connecting portion 9 of the tubular element 2 also comprises at least one internal bridging surface 13 departing from the side walls 7a of the outlet portion 7 and substantially converging on the longitudinal axis Y of the tubular element 2, or in practice, toward the spout 5 created by the selfsame tubular element 2.

More precisely, the bridging surface 13 in question can present an irregular profile, inasmuch as it might include differently oriented sections 13a and 13b, but will in any event form an angle no greater than 90° with the longitudinal axis Y of the tubular element 2. In other words, each section 13a and 13b of the bridging surface 13 is disposed in such a way that the food product inside the container can flow freely from the spout 5 without stagnating and/or accumulating at any point along the way.

In a first embodiment of the communicating duct 1, shown in FIGS. 1 to 4, the bridging surface 13 presents first sections 13a extending substantially parallel to the respective side walls 7a of the outlet portion 7 and at least one second section 13b integral with the first sections 13a, substantially normal to the longitudinal axis Y of the tubular element 2. With this configuration, the profile described by the internal bridging surface 13 along the direction of the spout 5 substantially resembles that of a funnel, following and complementing the internal profile presented by the outlet portion 7 of the container 4.

Figure 6:
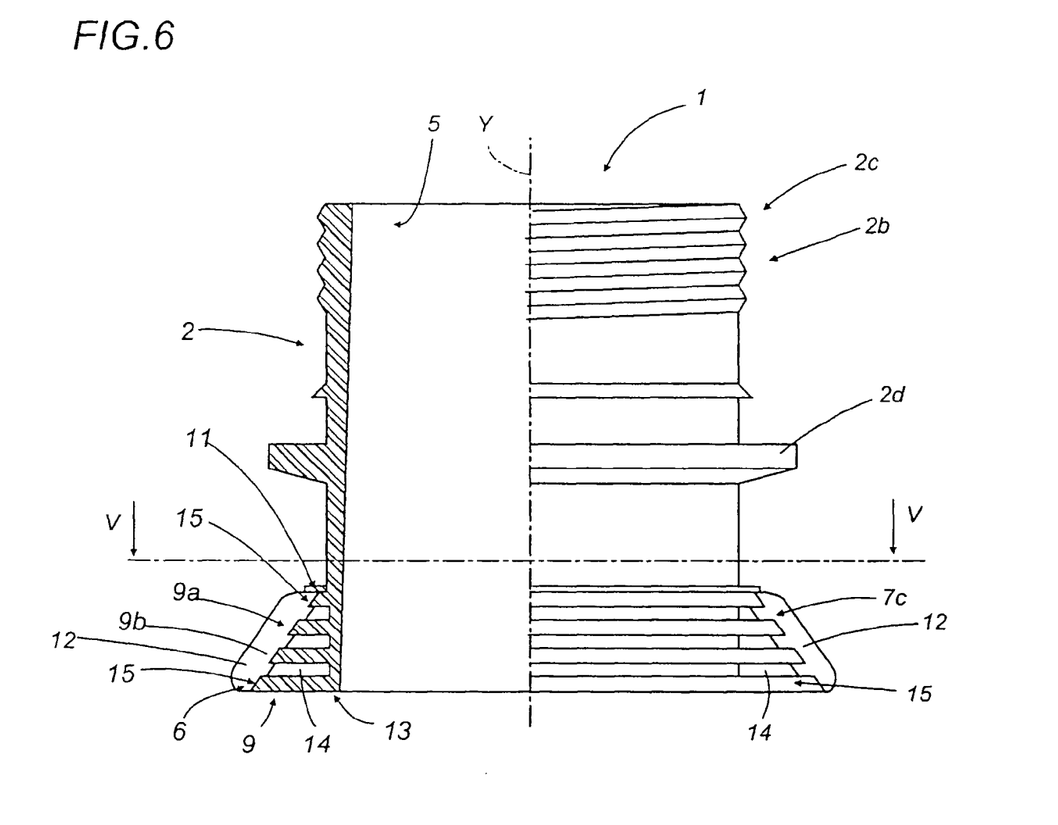
FIG. 6 is a half-section of the duct illustrated in FIG. 5, taken on IV-IV in FIG. 5.

In a second embodiment of the communicating duct 1, illustrated in FIGS. 5 and 6, the connecting portion 9 presents a substantially solid structure and the connecting area 9a presents a plurality of alternating slots 14 and ribs 15 such as will serve as vents for any aeriform substances that may collect between the connecting area and the side walls of the outlet portion 7 during the course of the welding operation.

In the course of the welding operation, moreover, the slots 14 combine with the side walls 7a of the outlet portion 7 to create a plurality of chambers 16 in which the aforementioned aeriform substances will remain encapsulated, without influencing the effectiveness of the weld.

Still referring to the example of FIGS. 5 and 6, the internal bridging surface 13, which serves to convey the liquid food product in the container toward the spout 5, is disposed transversely to the longitudinal axis Y of the tubular element 2. To enhance the conveying action, the surface 13 might also be angled slightly toward the spout 5.

In the examples of the accompanying drawings, the tubular element 2 presents a bottom end denoted 2a and, located at a top end 2b opposite from the bottom end 2a, a coupling portion 2c such as will accept a closure in the form of a cap (not illustrated, being conventional). In addition, the tubular element 2 can be provided with one or more annular projections 2d, located between the coupling portion 2c and the connecting portion 9, such as can be engaged by suitable means (not illustrated) serving to handle the relative container 4 during the process of applying the communicating duct 1 and completing the packaging cycle.

The problems associated with the prior art are thus solved by the present invention, and the stated objects duly realized.

First and foremost, the communicating duct 1 according to the present invention enables optimum preservation of the food product batched into the container 4 with which it is associated, by virtue of its capacity to guarantee a hermetic sealing action and thus isolate the contents from the surrounding environment.

Moreover, the incorporation of a flat connecting area 9a greatly facilitates the operation of welding the duct to the side walls 7a of the relative outlet portion 7, simplifying the operation significantly and rendering the sealing action more effective.

Also advantageous is the inclusion of a connecting portion 9 with a bridging surface 13 located internally of the container 4, extending from the side walls 7a of the outlet portion 7 to the spout 5 of the tubular element 2, which ensures the liquid product will flow directly to the spout without stagnating inside the container. In short, the particular geometry of the bridging surface 13 is such that there are no pockets or depressions directed toward the base 6a of the container 4, which in the case of the aforementioned prior art solutions are liable to trap both the flushing liquids used in manufacture, and the food product with which the container is ultimately filled.

With this feature of the communicating duct 1 in mind, the invention achieves a notable reduction in the costs of producing and/or marketing containers 4 of the type in question, given that if flushing liquids are prevented from stagnating inside the containers, manufacturers are able to eliminate the need for costly equipment that might otherwise be needed to remove such accumulated liquids from the containers 4.

The invention claimed is:

1. A communicating duct for a container, comprising:
at least one tubular element anchorable to an outlet portion of a container to create at least one spout having a passage between the container and the surrounding environment; and
at least one connecting portion having at least one connecting area such as can be united hermetically with the outlet portion of the container, the connecting portion having an internal bridging surface forming a bottom surface of the communicating duct disposed substantially normal to the longitudinal axis of the tubular element that contacts a fluid contained within the container at least when pouring the fluid from the container;
the internal bridging surface having an external periphery and an internal periphery;
the external periphery being a bottom edge of a radially outward facing external peripheral surface for contacting the container around an entire periphery of an interior surface of the outlet portion of the container;
the internal periphery being a bottom edge of an entire circumference of an internal opening of the passage of the spout;
the internal bridging surface being a flat, uninterrupted and free-flowing surface covering an entire area extending between the external periphery and the internal periphery and being free of structure that can cause at least one of fluid stagnation and accumulation;
the at least one connecting area comprising a plurality of connecting surfaces substantially flat and equal to a number of side walls of the outlet portion; the connecting portion including at least one locating element extending transversely relative to the connecting area and positioned to engage in abutting contact with a terminal edge of a respective side wall of the outlet portion of the container axially above the internal bridging surface;
wherein each connecting surface establishes at least one corner edge positioned facing a respective internal corner formed between two side walls of the outlet portion of the container, the connecting portion including, for each corner edge, a relative radially cantilevered projection extending between two seams of a respective joined area of the outlet portion, each projection presenting a substantially flat and slender profile to be inserted between the seams of the outlet portion and to be bonded with such seams.

2. A duct as in claim 1, wherein the connecting area presented by the connecting portion of the tubular element extends substantially parallel to the outlet portion of the container, so that the connecting area can be offered entirely flush to the outlet portion.

3. A duct as in claim 1, wherein the connecting area is anchored to the inside face presented by the outlet portion of the container.

4. A duct as in claim 1, wherein the connecting area includes at least one opening able to vent any aeriform substances during an operation of joining the connecting area to the outlet portion of the container.

5. A duct as in claim 4, wherein the connecting area includes a plurality of openings able to vent any aeriform substances.

6. A duct as in claim 1, wherein the connecting surfaces are arranged around a longitudinal axis of the tubular element, in a plane substantially perpendicular to the longitudinal axis, each such connecting surface being interposed between two adjacent connecting surfaces.

7. A duct as in claim 6, wherein the connecting surfaces are arranged in the plane perpendicular to the longitudinal axis of the tubular element so as to describe a polygon.

8. A duct as in claim 7, wherein the polygon described by the connecting surfaces is a quadrilateral.

9. A duct as in claim 6, wherein the connecting area includes a specific number of connecting surfaces equal to a number of side walls presented by the container, each individual surface extending parallel to the respective side wall of the outlet portion so as to bond hermetically with the side wall.

10. A duct as in claim 6, wherein each connecting surface combines with an adjacent connecting surface to form at least one corner edge facing a respective corner edge formed between two adjoining side walls of the outlet portion, and the connecting portion presents at least one projection associated with a relative corner edge, extending radially from the corner edge in relation to the longitudinal axis of the tubular element, insertable thus into a joined area of the outlet portion and weldable hermetically to the selfsame joined area.

11. A duct as in claim 6, wherein each connecting surface is angled relative to a plane substantially normal to the longitudinal axis of the tubular element so that the connecting portion appears substantially frustopyramidal in shape and each of the connecting surfaces includes a substantially trapezoidal outline.

12. A duct as in claim 6, wherein the connecting portion presents a substantially solid body, and each connecting surface includes a plurality of slots combining with a respective side wall of the outlet portion of the container to create a plurality of chambers for accommodating any aeriform substances that may be present.

13. A container, comprising:
a structure fashioned from at least one sheet of paper material and having at least one base portion, at least one outlet portion permanently associated and combining with the base portion to afford at least one cavity containing at least one food product, and at least one communicating duct anchorable to a outlet portion of the container to create at least one spout having a passage between the cavity and the surrounding environment;
wherein the communicating duct comprises: at least one tubular element anchorable to the outlet portion, and at least one connecting portion having at least one connecting area such as can be united hermetically with the outlet portion of the containers;
the connecting portion having an internal bridging surface forming a bottom surface of the communicating duct disposed substantially normal to the longitudinal axis of the tubular element that contacts a fluid contained within the container at least when pouring the fluid from the container;
the internal bridging surface having an external periphery here and an internal periphery;
the external periphery being a bottom edge of a radially outward facing external peripheral surface in contact with the container around an entire periphery of an interior surface of the outlet onion of the container;
the internal periphery being a bottom edge of an entire circumference of an internal opening of the passage of the spout;
the internal bridging surface being a flat, uninterrupted and free-flowing surface covering an entire area extending between the external periphery and the internal periphery and being free of structure that can cause at least one of fluid stagnation and accumulation;
the at least one connecting area comprising a plurality of connecting surfaces substantially flat and equal to a number of side walls of the outlet portion; the connecting portion including at least one locating element extending transversely relative to the connecting area and positioned to engage in abutting contact with a terminal edge of a respective side wall of the outlet portion of the container axially above the internal bridging surface;
wherein each connecting surface establishes at least one corner edge positioned facing a respective internal corner formed between two side walls of the outlet portion of the container, the connecting portion including, for each corner edge, a relative radially cantilevered projection extending between two seams of a respective joined area of the outlet portion, each projection presenting a substantially flat and slender profile to be inserted between the seams of the outlet portion and to be bonded with such seams.

* * * * *